United States Patent
Guo et al.

(10) Patent No.: US 6,620,885 B2
(45) Date of Patent: Sep. 16, 2003

(54) COPOLYMERS OF FUNCTIONALIZED POLYPHENYLENE ETHER RESINS AND BLENDS THEREOF

(75) Inventors: Hua Guo, Selkirk, NY (US); Narsi Devanathan, Slingerlands, NY (US); Charles Lewis, Parkersburg, WV (US)

(73) Assignee: General Electric Company, Pittsfield, MA (US)

( * ) Notice: Subject to any disclaimer, the term of this patent is extended or adjusted under 35 U.S.C. 154(b) by 92 days.

(21) Appl. No.: 09/943,290

(22) Filed: Aug. 30, 2001

(65) Prior Publication Data

US 2003/0078363 A1 Apr. 24, 2003

(51) Int. Cl.$^7$ .......................... C08F 8/00; C08F 283/08; C08G 65/48
(52) U.S. Cl. .......................... 525/132; 525/133; 525/63; 525/390; 525/391; 525/397
(58) Field of Search ................................. 125/132, 133, 125/63, 390, 391, 397; 525/132, 133, 63, 390, 391, 397

(56) References Cited

U.S. PATENT DOCUMENTS

| | | |
|---|---|---|
| 2,933,480 A | 4/1960 | Gresham |
| 3,093,621 A | 6/1963 | Gladding |
| 3,211,709 A | 10/1965 | Adamek et al. |
| 3,306,875 A | 2/1967 | Hay |
| 3,646,186 A | 2/1972 | Hager |
| 3,790,519 A | 2/1974 | Wahlborg |
| 3,884,993 A | 5/1975 | Gros |
| 3,894,999 A | 7/1975 | Boozer et al. |
| 4,059,654 A | 11/1977 | Von Bodungen et al. |
| 4,166,055 A | 8/1979 | Lee, Jr. |
| 4,360,618 A | 11/1982 | Trementozzi |
| 4,456,736 A | 6/1984 | Miyashita et al. |
| 4,481,332 A | 11/1984 | Somemiya et al. |
| 4,578,423 A | 3/1986 | Deets et al. |
| 4,584,334 A | 4/1986 | Lee, Jr. et al. |
| 4,614,773 A | 9/1986 | Sugio et al. |
| 4,614,774 A | 9/1986 | Sawa et al. |
| 4,778,849 A | 10/1988 | Bartmann et al. |
| 4,866,126 A | 9/1989 | Mylonakis et al. |
| 5,082,898 A | 1/1992 | Minematsu et al. |
| 5,091,480 A | 2/1992 | Percec |
| 5,191,031 A | 3/1993 | Ueda et al. |
| 5,231,146 A | 7/1993 | Brown et al. |
| 5,234,994 A | 8/1993 | Shiraki et al. |
| 5,237,005 A | 8/1993 | Yates, III |
| 5,290,881 A | 3/1994 | Dekkers |
| 5,352,745 A | 10/1994 | Katayose et al. |
| 5,665,821 A | 9/1997 | Lim et al. |
| 5,780,548 A | 7/1998 | Oshima et al. |
| 5,859,130 A | 1/1999 | Gianchandai et al. |
| 5,916,970 A | 6/1999 | Lee, Jr. et al. |
| 5,981,656 A | 11/1999 | McGaughan et al. |
| 6,054,516 A | 4/2000 | Yoshida et al. |
| 6,262,166 B1 | 7/2001 | Yoshida et al. |

FOREIGN PATENT DOCUMENTS

| | | |
|---|---|---|
| EP | 0 106 023 | 6/1983 |
| EP | 0 403 023 | 6/1990 |
| EP | 129 824 B1 | 9/1992 |

OTHER PUBLICATIONS

International Search Report Dated Jan. 2, 2003.
Abstract of JP 52052991 (1 page).
Abstract of WO 99/15585 (3 pages).

Primary Examiner—Duc Truong

(57) ABSTRACT

A copolymer having segments of polyphenylene ether, styrene and/or acrylonitrile, a method for making the copolymer, and a blend of the copolymer with a styrenic resin are provided. The polyphenylene ether segments are derived from polyphenylene ether polymers having at least one end cap that a pair of unsaturated aliphatic carbon atoms, i.e. a carbon—carbon double bond. The copolymer is miscible with styrene/acrylonitrile copolymers.

49 Claims, No Drawings

COPOLYMERS OF FUNCTIONALIZED POLYPHENYLENE ETHER RESINS AND BLENDS THEREOF

BACKGROUND OF THE INVENTION

1. Field of the Invention

The invention generally relates to polyphenylene ether resins and more specifically, relates to the manufacture of copolymers of functionalized polyphenylene ether resins having properties controlled by crosslinking and blends thereof. In one embodiment, the invention relates to reaction products between a polyphenylene ether resin containing functional groups and a polymer such as styrene acrylonitrile and blends thereof.

2. Brief Description of the Related Art

Polyphenylene ether (PPE) resins (also known within the art as "Polyphenylene Oxide") are an extremely useful class of high performance engineering thermoplastics by reason of their hydrolytic stability, high dimensional stability, toughness, heat resistance and dielectric properties. PPE resins are commercially attractive materials because of their unique combination of physical, chemical, and electrical properties. This unique combination of properties renders PPE resin based formulations suitable for a broad range of applications that are well known in the art. One example is injection molded products which are used for high heat applications. The more common PPE resins known in the art are typically comprised of PPE polymers of a fairly high molecular weight. These PPE polymers generally have in excess of 50 repeat monomer units, most often in excess of 80 or more repeat monomer units.

There is much interest in the art in providing blends of PPE resins with other resins such as styrenic resins. One material of interest has been Styrene-Acrylonitrile copolymer ("SAN") resins. Styrene-Acrylonitrile copolymer resins are transparent resins used in a variety of products including housewares, packaging, appliances, industrial batteries, and automotive and medical applications. In these markets, SAN resins are used because of their low unit cost, clarity, heat resistance, good processability and resistance to chemicals.

One technical obstacle to the development of some PPE resin/styrenic resin blends has been the lack of compatibility between PPE resin and certain styrenic resins. This lack of compatibility is often due to poor miscibility and manifests itself often through very poor physical properties as well as de-lamination in molded parts.

Efforts to create an integrated material of PPE resin and SAN resin have been met with difficulties. Methods for improving the miscibility of PPE polymers with certain styrenic polymer resins, such as SAN resins, are desired.

BRIEF SUMMARY OF THE INVENTION

In one aspect of the invention, a copolymer miscible with styrenic resins is disclosed which comprises PPE segments and segments of one or more styrene units, acrylonitrile units and combinations of styrene and acrylonitrile units, optionally containing other chemical species, e.g., rubbery species. The PPE segments are derived from a PPE resin comprising PPE polymer chains having at least one end cap containing a pair of unsaturated aliphatic carbon atoms, i.e. a carbon—carbon double bond.

The term "miscible" as used herein, refers to the ability of two polymers to form a single phase when melt blended together. This single phase can be identified by a single glass transition temperature.

In another aspect, this invention provides a composition comprising: a copolymer of this invention, and a styrenic resin, such as polystyrene (PS), styrene copolymers (such as SAN) and combinations thereof.

In a further aspect, a method for making a copolymer composition is disclosed. The method comprises introducing a PPE resin into a reaction medium comprising at least styrenic monomers and acrylonitrile monomers, wherein the amount of PPE resin is 5 to 20 wt % of the total combined weight of the PPE resin, the styrenic monomers and the acrylonitrile monomers and any additional optional co-polymerizable monomers. The PPE resin comprises at least one PPE polymer chain having at least one end cap that has a pair of unsaturated aliphatic carbon atoms, i.e. at least one carbon—carbon double bond. The PPE resin, styrenic monomers and acrylonitrile monomers loaded in the reaction medium are subsequently polymerized into a PPE copolymer. The reaction medium can be a bulk reaction medium or a reaction medium that contains another liquid which suspends or emulsifies the reactive components.

The PPE resin employed to provide PPE segments comprises PPE polymer chains. These PPE polymer chains are known polymers comprising a plurality of phenylene ether units of the formula (I):

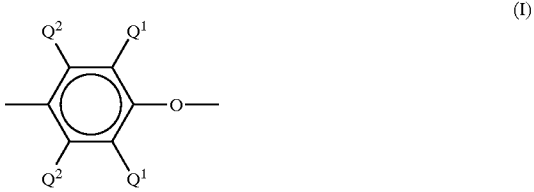

Each structural unit may be the same or different, and in each structural unit, each $Q^1$ is independently a halogen, primary or secondary lower alkyl (i.e., alkyl containing up to 7 carbon atoms), phenyl, haloalkyl, aminoalkyl, hydrocarbonoxy, or halohydrocarbonoxy, at least two carbon atoms separate the halogen and oxygen atoms; and each $Q^2$ is independently a hydrogen, halogen, primary or secondary lower alkyl, phenyl, haloalkyl, hydrocarbonoxy or halohydrocarbonoxy as defined for $Q^1$. Most often, each $Q^1$ is alkyl, especially $C_{1-4}$ alkyl, and each $Q^2$ is hydrogen or alkyl, especially $C_{1-4}$ alkyl.

Specific polyphenylene ether polymers useful in the present invention include but are not limited to poly(2,6-dimethyl-1,4-phenylene ether);
poly (2,6-dimethyl-co-2,3,6-trimethyl-1,4-phenylene ether);
poly(2,3,6-trimethyl-1,4-phenylene ether);
poly(2,6-diethyl-1,4-phenylene ether);
poly(2-methyl-6-propyl-1,4-phenylene ether);
poly(2,6-dipropyl-1,4-phenylene ether);
poly(2-ethyl-6-propyl-1,4-phenylene ether);
poly(2,6-dilauryl-1,4-phenylene ether);
poly(2,6-diphenyl-1,4-phenylene ether);
poly(2,6-dimethoxy-1,4 phenylene ether);
poly(2,6-diethoxy-1,4-phenylene ether);
poly(2-methoxy-6-ethoxy-1,4-phenylene ether);
poly(2-ethyl-6-stearyloxy-1,4-phenylene ether);
poly(2,6-dichloro-1,4-phenylene ether);
poly(2-methyl-6-phenyl-1,4-phenylene ether);
poly(2-ethoxy-1,4-phenylene ether);

poly(2-chloro-1,4-phenylene ether);
poly(2,6-dibromo-1,4-phenylene ether);
poly(3-bromo-2,6-dimethyl-1,4-phenylene ether); or mixtures thereof.

Suitable PPE resins include homopolymers and copolymers of the structural units of formula I. The preferred homopolymers are those containing 2,6-dimethyl-1,4-phenylene ether units. Suitable copolymers include random and blocked copolymers containing such units in combination with, for example, 2,3,6-trimethyl-1,4-phenylene ether units to produce poly (2,6-dimethyl-co-2,3,6-trimethyl-1,4-phenylene ether) resins. Also included are PPE resins containing moieties prepared by grafting vinyl monomers or polymers such as polystyrenes and elastomers, as well as coupled PPE resins in which coupling agents such as low molecular weight polycarbonates, quinones, heterocycles and formals undergo reaction in a known manner with the hydroxy groups of two poly(phenylene ether) polymer chains to produce a higher molecular weight polymer, provided a substantial proportion of free hydroxyl groups remains.

The term "polyphenylene ether resin," (and "PPE resins") as used in the specification and claims herein, includes unsubstituted polyphenylene ether polymers, substituted polyphenylene ether polymers wherein the aromatic ring is substituted, polyphenylene ether copolymers and blends thereof.

The PPE resins contemplated for use in the present invention include all those presently known, irrespective of variations in structural units or ancillary chemical features. The molecular weight of the polymers that form the PPE resin and the intrinsic viscosity of the PPE resin can vary widely, depending at least in part on the intended end-use for the PPE resin. The intrinsic viscosity (hereinafter "I.V.") of the PPE resin is typically in the range of about 0.08–0.60 dl./g., as measured in chloroform at 25° C. by the methods described in the procedure below.

Verify bath temperature is at 25° C.±0.1° C.

All I.V. measurement should be done on PPE resin that has been dried in a vacuum oven for a period of at least 1 hour at a temperature of 125° C. Let powder cool about 5 minutes prior to weighing.

Using an analytical balance, place a 2 oz bottle (with cap) on balance and tare. Weigh film in the bottle, target about 0.4000 grams. Record powder weight on sample long sheet.

Tare the weight of bottle (with cap) and powder. Add 50 ml of chloroform. Record weight of the chloroform on the sample log sheet. Place bottle on shaker, shake sample until it is dissolved.

To run a sample, add about 24 ml of filtered sample (filter through 12 ml autovial filters) into viscometer. Remove filter from inlet port of viscometer. Attach squeeze bulb to vacuum line on the viscometer. Slowly draw sample up the viscometer until it is about 0.6 cm above the upper measurement line. Remove the squeeze bulb and vent stopper from the viscometer. As the sample reaches the upper measurement line, begin timing of the drop using a timer. When the sample reaches the lower measurement line, stop timing.

Record drop time of sample on sample log sheet.

Calculate I.V., using computer software known in the art.

The I.V. of useful PPE resins is sometimes less than 0.32 dl/g as measured in chloroform at 25° C., and can be less than 0.20 dl/g.

The PPE resins as used herein are typically obtained by oxidative coupling of at least one monovalent phenol species, preferably at least a portion of which have substitution in at least the two ortho positions and hydrogen or halogen in the para position, using an oxygen containing gas and a complex metal-amine catalyst, preferably a copper (I)-amine catalyst, as the oxidizing agent and, preferably extracting at least a portion of the metal catalyst as a metal-organic acid salt with an aqueous containing solution.

In general, the molecular weight of the PPE resins can be controlled by controlling the reaction time, the reaction temperature and the amount of catalyst. Longer reaction times will usually provide a higher average number of repeating units and a higher intrinsic viscosity. At some point, a targeted molecular weight (often measured as I.V.) is obtained and the reaction terminated by conventional means. For example, in the case of reaction systems which make use of a complex metal catalysts, the polymerization reaction may be terminated by adding an acid, e.g., hydrochloric acid, sulfuric acid and the like or a base e.g., potassium hydroxide and the like or the product may be separated from the catalyst by filtration, precipitation or other suitable means as taught by Hay in U.S. Pat. No. 3,306,875.

When combining PPE resins with other resins by either blending, crosslinking, or polymerization reactions, including free radical reactions, it is highly desirable from the standpoints of low viscosity for mixing and a high endgroup number for functionalization to have a PPE resin that has less than 50 repeat monomer units on average, and preferably less than about 35 repeat monomer units on average.

Recent advances in PPE resin process chemistry have allowed for the development of a low molecular weight PPE resin, an example of which is known as PPO12, which is ideally suited for preparing the copolymers of this invention. PPO12 comprises 2,6-dimethylphenylene ether units and has an intrinsic viscosity of 0.12 dl/g±0.02 as measured in chloroform at 25° C.

Low molecular weight PPE resins such as PPO12 show a reasonably high Tg that equates to high heat performance yet have much lower melt viscosity as compared to high molecular weight grades. These two aspects are very important for performance/processability balance.

The PPE resins employed to form the copolymers of this invention comprise polymers chains that have at least one end cap containing a pair of unsaturated aliphatic carbon atoms, i.e. a carbon—carbon double bond. This end cap increases the reactivity of the PPE polymer so as to facilitate copolymerization with other monomers or copolymers having unsaturated aliphatic carbon atoms such as styrene monomers and acrylonitrile monomers or styrene/acrylonitrile copolymers, or the combination of styrene monomers, acrylonitrile monomers and styrene/acrylonitrile copolymers, optionally containing other polymerizable monomers.

By "capped", it is meant preferably at least about 80%, more preferably at least about 90%, most preferably at least about 95% of the PPE polymer chains have end caps with a pair of unsaturated aliphatic carbon atoms, preferably vinyl moieties. PPE polymer chains often have Mannich end groups ((alkyl)$_2$N—) formed during the polymerization. These Mannich end groups can be converted to active hydroxy end groups by known techniques to increase the number of end caps per PPE polymer, e.g., by subjecting the PPE resin to elevated temperatures such as, greater than about 150° C., preferably greater than about 180° C. or higher.

The end caps on the PPE polymer can be provided by reacting the hydroxyl groups of the PPE polymer with a suitable reactive species that provides at least one pair of unsaturated aliphatic carbon atoms. This is carried out by allowing the PPE polymers to react with a suitable capping agent. Suitable capping agents used in the present invention to introduce the aliphatic unsaturation onto the PPE include an unsaturated compound of the general formula (I):

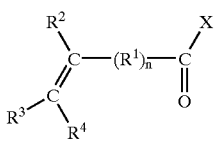
(II)

$R^1$ is an aliphatic, cyclic, or aromatic residue, for example, —$CH_2$— but may be multiple —$CH_2$— groups, e.g., n can vary from 1 to about 10 or more, or alternatively, n may equal zero wherein the formula is an acrylic residue. Each of $R^2$, $R^3$, and $R^4$ are independently hydrogen, alkyl (preferably $C_1$–$C_{10}$ alkyl), or aryl (preferably by $C_6$–$C_{10}$ aryl), and X is a residue of one of the following formulae (III):

(III)

Alternatively, X may be a halogen or may be a residue of the formula (IV):

(IV)

$R^7$ is an aliphatic or aromatic residue, for example, —$CH_2$— but may be multiple —$CH_2$— groups, e.g., m can vary from 1 to about 10 or more, or alternatively, m may equal zero (if n and m both equal zero, the unsaturated compound is an acrylic anhydride).

Each $R^8$, $R^9$, and $R^{10}$ are independently hydrogen, alkyl, or aryl. In a preferred embodiment, the unsaturated compound is of the formula (V):

(V)

wherein each of n, $R^1$, $R^2$, $R^3$, and $R^4$ are as previously described. In an especially preferred embodiment, the unsaturated compound is of the formula (VI):

(VI)

However, included within the scope of the present invention are "mixed" or "unsymmetrical" anhydrides of formula (V).

The capping agent typically has one or more vinyl groups. The capping agent can be a styrene, a styrene based monomer, a substituted styrene, an acrylic based monomer, acrylonitrile, an acrylonitrile based monomer, an epoxy based monomer, methyl methacrylate, ethyl methacrylate, or other suitable material. The capping agent is preferably an unsaturated anhydride such as methacrylic acid anhydride.

As stated herein, the PPE polymer can be capped by the addition of at least one unsaturated anhydride such as methacrylic acid anhydride (MAA), preferably in solution, to form a capped PPE polymer referred to herein as PPE-methacrylic acid anhydride (PPE-MAA). Methacrylic acid anhydride is highly reactive in radical reactions, and is very reactive with styrenic polymers. The PPE-MAA can build into styrenic copolymers via the methacrylate double bond which remains after reaction with the PPE polymer.

The end capping reaction is typically done in the presence of at least one catalyst by conventional methods or by the methods given in the examples which follow. The catalyst is preferably an amine-type catalyst such as DMAP (N, N-dimethylamino pyridine). After the capping step, the PPE resin typically comprises PPE polymer chains having one or two end caps per polymer chain. As previously discussed, it is preferable for at least about 80%, preferably at least about 90%, more preferably at least about 95% or more of the hydroxy groups within the PPE polymer chains to be capped. In an especially preferred embodiment, substantially all of the hydroxyl moieties of the PPE have been capped. Mixtures of endcaps, including mixture of reactive and non-reactive endcaps (endcaps no containing a residual carbon—carbon double bond) may also be used.

Although not wishing to be bound by any theory on the nature or mechanism of the chemical reaction between the PPE polymer and the unsaturated compound of formula (II), it is presumed that the functionalization of the PPE polymer takes place through the hydroxyl groups on the PPE polymer resulting in a PPE polymer containing aliphatic unsaturation comprising the formula (VII):

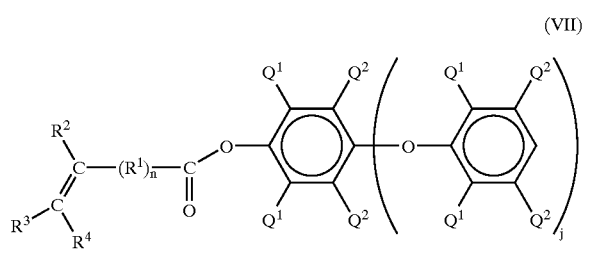

(VII)

Each of $Q^1$, $Q^2$, n, $R^1$, $R^2$, $R^3$, and $R^4$ is as previously defined and j comprises a range of values generally on average between about 10 and 110 depending in large part on the I.V. of the PPE resin.

Additionally, multiple aliphatic unsaturation can also be introduced onto the PPE polymer through incorporation of branching agents and/or coupling agents into the PPE polymer backbone structure such that more than one end of the PPE polymer contains hydroxyl groups for capping. Such branching agents and/or coupling agents are known in the art and include compounds such as, for example, tetramethylhydroquinone and trishydroxyphenol.

A reaction a between a PPE polymer and capping agent (MAA) is depicted below.

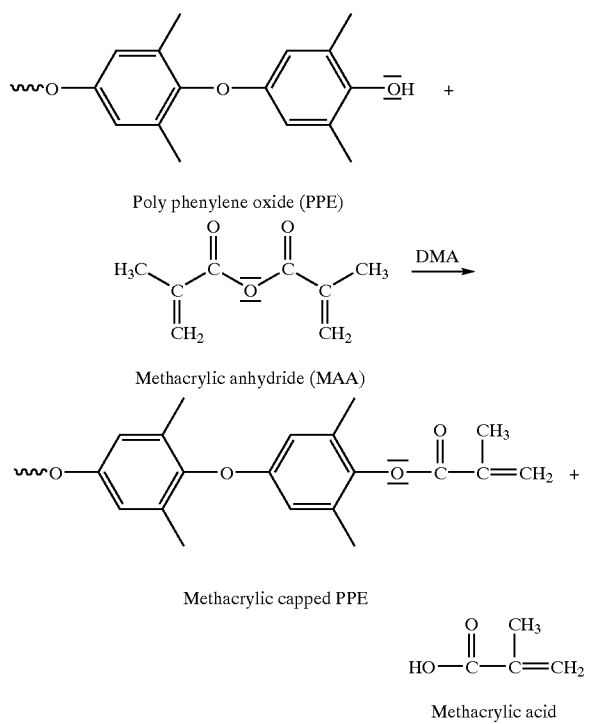

Ester formation occurs between a phenolic end group of the PPE polymer and a carboxylic group of the methacrylic acid anhydride.

The amount of the above mentioned end capping agents employed is preferably that required to provide, on average, at least one end cap for each PPE polymer chain. The mole ratio of capping agent to hydroxyl group per PPE polymer can range from 0.5:1 to 10:1. These reactions are typically performed at a temperature in the range of 0° C. to 100° C. in the presence of a catalyst, e.g., N,N-dimethylaminopyridine catalyst (DMAP). The end capped PPE-MAA polymer typically has an intrinsic viscosity between about 0.08 dl/g and 0.60 dl/g, at 25° C. as measured in chloroform and more preferably between about 0.10 dl/g and about 0.30 dl/g at 25° C. as measured in chloroform.

The PPE polymer containing an end cap having at least one pair of unsaturated aliphatic carbon atoms is capable of copolymerizing with other monomers, polymers or copolymers having a pair of unsaturated aliphatic carbon atoms by conventional free radical polymerization techniques, typically with an initiator, such as those activated by the application of heat, U.V. radiation or electron beam radiation. An example of a suitable initiator is AIBN, 2,2'Azo-bis isobutyronitrile. The initiators are typically added at 0.1 wt. % or less. The PPE polymers can also react by conventional ionic polymerization, atom transfer and living free radical polymerization techniques.

The PPE polymers with such end caps are copolymerized in conjunction with a) styrene and acrylonitrile monomers or b) styrene/acrylonitrile copolymers or c) a combination of styrene/acrylonitrile copolymers, styrene monomers and acrylonitrile monomers. The PPE polymer chains may have two end caps to provide two reaction sites for forming crosslinks. Mixtures of mono-capped PPE chains and PPE chains containing two or more end caps are also useful.

The segments of styrene and acrylonitrile units can be derived from monomer mixtures comprising styrene and acrylonitrile monomers or styrene/acrylonitrile copolymers or combinations of styrene/acrylonitrile copolymers with styrene monomers and/or acrylonitrile monomers. Styrene/Acrylonitrile copolymers (SAN), also known as poly(styrene-co-acrylonitrile), are simple random copolymers of styrene(s) monomers and acrylonitrile (AN) monomers.

A formula for a Styrene-Acrylonitrile segment is shown as formula (VIII):

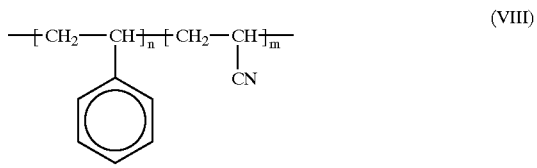

(VIII)

wherein n=0–100 and m=0–50.

The styrene/acrylonitrile copolymers (SAN) that can be copolymerized with PPE polymers are preferably simple random copolymers of styrene and acrylonitrile monomers, optionally containing other monomers known in the art to copolymerize with styrene and acrylonitrile. PPE polymers containing two or more end caps is believed to form crosslinked chains between SAN copolymers and the PPE. With only one end cap, the PPE polymer is integrated with the styrene and acrylonitrile units to form a comb-type structure with the PPE polymer segments forming the "teeth" of the comb. Without end caps, the hydroxyl groups on the PPE polymer chains tend to inhibit the reaction of styrene monomers and styrene/acrylonitrile copolymers. The capped PPE polymer forms part of the "spine" of the comb structure via the methacrylic double bonds. Crosslinking between comb structures can be expected to increase with increasing numbers of PPE polymers having carbon—carbon double bonds on the polymer chains, e.g., on both chain ends.

To provide copolymerization and control crosslinking so as to form a copolymer that can be melt processed for subsequent blending, the amount of PPE polymer (loading) which is available for reaction with the SAN is controlled. The amount of PPE resin in the reaction medium is preferably kept in the range of 5 to 20 wt. % based on the total weight of the PPE resin and monomers, i.e. the styrenic monomers and the acrylonitrile monomers. It has been unexpectedly discovered that at levels above 20 wt. % loading of PPE resin, copolymers which are miscible with styrenic polymers are drastically reduced. The PPE-MAA and SAN typically do not copolymerize together at high PPE polymer loadings, forming separate polymers in the reaction mix, which are isolated from, and settle separately from each other.

Typically, the amount of end capped PPE resin introduced to the reaction medium is 5 to 15 wt. %, based on the total weight of the reactive components. More preferably, the amount of end capped PPE polymer loaded in the reaction medium is 10% to 15% by weight, based on the total weight of the reactive components. Despite the low loadings, the PPE segments can comprise up to 80% of the copolymer by weight after copolymerization, and often fall within the range of 50 to 80 wt. % of the copolymer. The Tg values of the copolymers increase with increasing levels of PPE and typically range from 144° C. to 170° C.

The PPE-SAN copolymers of this invention offer the advantage of being miscible with styrenic resins such as SAN, resulting in a composition retaining the positive qualities of PPE, particularly fire retardency and a relatively high Tg. By relatively high Tg is meant a Tg in excess of the Tg of SAN.

At this juncture, the copolymers of this invention can be blended with styrenic resins with the use of conventional blending means such as an extruder or a Banbury mixer. The copolymers of this invention and the styrenic resin form a compatible copolymer blend, which is another embodiment of this invention. Further, it is believed some crosslinking activity may occur between the PPE copolymer and the styrenic resin at their interface, further joining the copolymer and styrenic resin. Beads of the blend are typically formed for further melt processing. The blend can further have other components such as fiber reinforcement and/or a free radical initiator incorporated therein. The free radical initiator will provide for the polymerization of any unreacted vinyl groups on the cross-linked polymer or on the styrenic resin The styrenic resin that is miscible with the cross-linked copolymer preferably comprises about 5 to 95 wt. % of the total composition. Amounts in the range of 50–75 wt % are particularly suitable. The styrenic resin is typically polystyrene (PS), expandable polystyrene (EPS), acrylonitrile-butadiene-styrene (ABS), styrene acrylonitrile (SAN), styrene butadiene rubbers (SBR), styrene-maleic anhydride (SMA) copolymers, alkyl methacrylate styrene acrylonitrile (AMSAN); polychlorostyrene, polyvinyltoluene, rubber-modified polystyrene (HIPS), and combinations thereof.

Indications of improved compatibility include resistance to delamination, improved physical properties such as increased tensile and impact properties and a stabilized morphology between the blend component phases under static and/or low shear conditions.

The composition of this invention can exhibit flame retardant properties without the use of halogen and preferably, is sufficiently flame retardant so as to char in the presence of air at temperatures above the glass transition temperature of the composition, and has a V-0 flammability rating, as determined by conventional methods.

The compositions of styrenic resin(s) and copolymer(s) of this invention are sufficiently compatible so that the blend has a single phase, which can be manifested by a single glass transition temperature. The glass transition temperature of the blend is typically between the glass transition temperature of the styrenic resin and that of the PPE copolymer, and is typically about 100° C. to about 175° C. Further, the blend typically has a heat distortion temperature greater than 125° C.

The composition of the present invention can contain additional components other than the styrenic resin and copolymer. The additional components can comprise another thermoplastic resin. For example, the following resins may be blended therewith:

polyphenylene ether homopolymers without end caps as described above, polyamides as disclosed in U.S. Pat. Nos. 5,981,656 and 5,859,130, polyarylene sulfides as disclosed in U.S. Pat. No. 5,290,881, polyphthalamides as disclosed in U.S. Pat. No. 5,916,970, polyether amides as disclosed in U.S. Pat. No. 5,231,146 and polyesters as disclosed in U.S. Pat. No. 5,237,005.

Additional component(s) that may be added to the blend of thermoplastic resin may be an impact modifier, flame retardant, plasticizer, antioxidant, filler, conductive filler (e.g. conductive carbon black, carbon fibers and nanofibers, stainless steel fibers, metal flakes, metal powders and the like); reinforcing agent, (e.g. of glass fibers), stabilizer (e.g. oxidative, thermal and ultraviolet stabilizers), antistatic agent, lubricant, colorant, dye, pigment, drip retardant, flow modifier, blowing agent or other processing aid.

A suitable impact modifying material for polyphylene ether resins includes natural rubbers, synthetic rubbers and thermoplastic elastomers. These additives are typically derived from monomers such as olefins and may be homopolymers as well as copolymers including random, block, graft and core shell copolymers.

Polyolefins which can be blended with polyphenylene ether resins by the methods of this invention are of the general structure $C_nH_{2n}$ and include polyethylene, polypropylene and polyisobutylene with preferred homopolymers being polyethylene, LLDPE (linear low density polyethylene), HDPE (high density polyethylene), MDPE (medium density polyethylene) and isotatic polypropylene. Specific examples of polyolefin resins suitable for use in the present invention are defined in U.S. Pat. Nos. 2,933,480, 3,093,621, 3,211,709, 3,646,186, 3,790,519, 3,884,993, 3,894,999, 4,059,654, 4,166,055 and 4,584,334.

Other suitable materials for impact modification include conjugated diene homopolymers and random copolymers. Examples include polybutadiene, butadiene-styrene copolymers, butadiene-acrylate copolymers, isoprene-isobutene copolymers, chlorine butadiene polymers, butadiene acrylonitrile polymers and polyisoprene. The impact modifiers may comprise of 0 to 30 wt. % of the total composition. Copolymers of ethylene, $C_3$–$C_{10}$ monoolefins and non-conjugated dienes, such as ethylene propylene diene modified rubbers (EPDM) are used in smaller amounts of from about 0.1% to 10% by weight based on the weight of the total composition. This amount generally falls within the range of 0.25% to about 7% by weight of the composition.

A particularly useful class of impact modifiers with conjugated dienes comprises the AB (di-block), $(AB)_m$-R (di-block) and ABA' (tri-block) block copolymers. Blocks A and A' are typically alkenyl aromatic units and Block B is typically a conjugated diene unit. For block copolymers of the formula $(AB)_m$-R, integer m is at least 2 and R is a multifunctional coupling agent for the blocks of the structure AB.

Also useful are core/shell graft copolymers of alkenyl aromatic and conjugated diene compounds. Especially suitable are those comprising styrene blocks and butadiene, isoprene or ethylene-butylene blocks. Suitable conjugated diene blocks include the homopolymers and copolymers described above which may be partially or entirely hydrogeneated by known methods, whereupon they may be represented as ethylene-propylene blocks or the like and have properties similar to those of olefin block copolymers. The suitable alkenyl aromatics include styrene, alpha-methyl styrene, para-methyl styrene, vinyl toluene, vinyl xylene and vinyl naphthalene. The block copolymer preferably contains from about 15 to 80% alkenyl aromatic units. Examples of triblock copolymers of this type are polystyrene-polybutadiene-polystyrene (SBS), hydrogenated polystyrene-polybutadiene-polystyrene (SEBS), polystyrene-polyisoprene-polystyrene (SIS) and poly(alpha-methylstyrene)-polyisoprene-poly(alpha-methylstyrene). Examples of commercially available triblock copolymers are the CARIFLEX®, KRATON D® and KRATON® G series from Shell Chemical Company, and TUFTEC from Asahi Chemical Industry Co. Ltd.

Other additives which may be introduced into the blends of copolymer and styrenic resin of the claimed invention include flame retardants known in the art including halo-substituted diaromatic compounds as described in U.S. Pat. No. 5,461,096 and phosphorous compounds as described in U.S. Pat. No. 5,461,096. Other examples of halosubstituted aromatic flame retardant additives include brominated benzene, chlorinated biphenyl, brominated polystyrene, chlorine containing aromatic polycarbonates or compounds comprising two phenyl radicals separated by a divalent alkenyl group having at least two chlorine or two bromine atoms per phenyl nucleus, and mixtures thereof. The level of flame retardant can range from 0.5 to 30 wt % and preferably provides a V-0 flammability rating as determined by conventional methods such as the one described below.

Step 1—set up the equipment to verify flame height of 1.9 cm.

Step 2—verify the flame will heat a 1.76 gm copper slug from 100° C.-700° C. in 42–46 seconds.

Step 3—position a specimen such that its low tip is halfway into the flame. Remove the flame after 10 seconds. Record the time for the specimen to self extinguish. Reposition specimen in flame as above. Remove after 10 seconds and record the time for the specimen to self extinguish. Consult Underwriters Laboratory U.L. 94 test protocol to classify material based on time record.

Reinforcing agents such as glass fibers can be used and are preferably employed in an amount of from 0 to 60% by weight of the total composition. Preferred amounts range from 3 to 30% weight. Other suitable reinforcing fibers include carbon fibers, KEVLAR® fibers, stainless steel fibers and metal coated graphite fibers. Suitable non-fiberous inorganic fillers include mica, clay, glass beads, glass flakes, graphite, aluminum hydrate, calcium carbonate, silica, kaolin, barium sulfate, talcum and calcium silicate (Wollastonite). Effective amounts for these fillers range from about 0.25 to 60 wt %.

Pigments may also be introduced into the blends of copolymer and styrenic resin and include those conventionally known such as titanium dioxide and carbon black. Suitable stabilizers include zinc sulfide, zinc oxide and magnesium oxide. Suitable UV stabilizers include 4,6-dibenzyl resorcinols, alkanol amine morpholenes and benzotriazole. Suitable antioxidants include hydroxyl amines, hindered phenols, benzofuranones, hindered amines, aryl phosphites and alkyl phosphites and are preferably used in an amount of 0.1 to 1.5 wt %.

Suitable flow promoters and plasticizers include the phosphate placticizers such as cresyl-diphenylphosphate, triphenyl phosphate, tricresyl phosphate, isopropylated and triphenyl phosphate. Chlorinated biphenols and mineral oil are also suitable. When used, the amount of plasticizer typically falls within the range of about 1 to 10 wt % based on the weight of the total composition.

Blowing agents may also be introduced into the blend of copolymer and styrenic resin of this invention. Suitable blowing agents are those conventionally known in the art such as low boiling halohydrocarbons and those that generate carbon dioxide. Other blowing agents suitable for use in this invention are solid at room temperature and when heated to temperatures higher than their decomposition temperature, they generate gases such as nitrogen, carbon dioxide, ammonia gas, etc. These include azodicarbonamide, metal salts of azodicarbonamide, 4,4'-oxybis (benzenesulfonylhydrazide), sodium bicarbonate, ammonium carbonate, etc. The amount used typically is in the range of 0.1 to 20 parts by weight per 100 parts by weight of the thermoplastic resin.

The blends of copolymer and styrenic resin of the present invention can be prepared in an extruder which preferably has a section that provides "compounding" or "distributive mixing" so as to disperse the components of the blend. The extruder can be a single screw extruder or a twin screw extruder. The components of the blend can be fed into the extruder in a conventional manner using a conventional feed hopper and the one or more additional components can either be fed in the same feed hopper or a separate port located downstream, preferably after the blend components have melted. The blend components may be mixed with other components prior to feeding into the extruder.

The additional components added to the blends of the present invention can range from about 0.01 to about 500 parts by weight per 100 parts of the styrenic resin plus the copolymer. These can include other thermoplastic resins, processing aids, fillers, pigments and reinforcing materials as discussed above.

The blends of the present invention can be used for a number of purposes, including use as a prepreg or a sheet molding compound. The compositions of this invention are suitable for use in molded articles, expandable packaging materials and expandable building materials in areas such as the transportation industry, biochemical industry and medical industry.

One of two methods will typically be used for copolymerizing the capped PPE with styrene and acrylonitrile monomers, copolymers of styrene with acrylonitrile, or both. They can be copolymerized using a bulk method or a suspension method. Bulk polymerization comprises performing the reaction without solvent in the presence of a liquid monomer with initiator.

Suspension polymerization is a system in which monomer is suspended as the discontinuous phase of droplets in a continuous phase and polymerized. The continuous phase is usually water, as most monomers are relatively insoluble in water. In suspension polymerization, a catalyst is dissolved in the monomer (styrene/styrene-acrylonitrile), which is dispersed in water. A dispersing agent or surfactant, e.g. poly-(vinylalcohol), is added separately to stabilize the resulting suspension. The chemical properties of products from suspension polymerization may differ from those prepared by bulk polymerization, a factor which should be considered when choosing between the methods. The usual ranges of reaction temperature for the suspension are usually between 40 and 90° C. Initiators are added in the range of 0.1 wt % of the monomer or less. The surfactant system helps establish the initial monomer, droplet size distribution, controls droplet coalescence and reduce particle agglomeration. The suspension stabilizer affects particle size and shape as well as the clarity and transparency.

Sample methods for capping the PPE polymers, crosslinking or copolymerizing the capped PPE polymers and isolating the copolymer product are illustrated herein.

EXAMPLES

Example 1

Capping PPE Resin with MAA

Charge a 3-neck round-bottom flask with magnetic stirring and appropriate amounts of toluene, PPE resin (20 wt. % solids) and (1.5 wt. %) DMAP (N,N-dimethyl aminopyridine) under vigorous stirring. Connect a water cooler to one neck and a nitrogen gas inlet to another. Close the third neck with a glass stopper. Apply a slow nitrogen purge. Place a flask in an oil bath stirring mechanism and let the mixture heat to 100° C. When the PPE resin and DMAP are dissolved, start the reaction by adding the appropriate amount (3 wt. % vs. PPE resin) of MAA to the mixture. When the reaction time has elapsed (after 4 hours) remove the oil bath, water cooler and nitrogen inlet tube. Cool the mixture down in a beaker with ice. After this, isolation of the product is carried out.

Example 2(a)

Copolymerizing the PPE Resin in Bulk

Charge a 3-neck roundbottom flask with a magnetic stirrer and appropriate amounts of monomers (styrene/styrene-acrylonitrile) and PPE resin (less than 20 wt % of total) under stirring of 100 rpm. Connect a water cooler and nitrogen gas inlet and apply a slow nitrogen purge. Place the flask in an oil bath and let the mixture heat to the desired temperature (80° C.). When the PPE is dissolved in toluene, start the reaction by adding the appropriate amount ($6*10^{-3}$ mol/l versus monomer) of AIBN (Azo bis isobutyronitrile) to the mixture. When the reaction time is elapsed (after 1 hour), remove the oil bath and cool the mixture down so the product can be isolated.

Example 2(b)

Copolymerizing the PPE Resin in Suspension 600 ml boiled demineralized water containing 1.0 g polyvinylalcohol (PVA)-dispersing agent is heated at 75° C. under continuous stirring at 250 rpm. The reaction is carried out in 1-liter reactor and under a nitrogen atmosphere. In this solution is dispersed a previously prepared 10 wt. % PPE resin (for SAN suspension) in a monomer solution. After 10–20 minutes the radical initiator AIBN (0.6 g) dissolved in ca.10 g acetone is added. After a total reaction time of 7 hours, the mixture is cooled down to room temperature and allowed to sediment overnight. If possible, the water layer is decanted from the suspension and the product is given further treatment as needed.

Example 3

Isolating The Product (and Precipitating with Methanol)

The products of examples 2(a) and 2(b) are isolated by precipitation in methanol and then filtrated over a Buchnner funnel and washed several times with methanol. If the precipitation is not possible, the sample is first dissolved in chloroform and then precipitated with methanol. Subsequently, the product is placed in a vacuum oven at a desired temperature, preferably overnight to remove all the traces of styrene, methanol and water.

The following charts illustrate results from the blending of the crosslinked copolymer and styrene resins.

Table 1 shows blend characteristics using different PPE polymers at different levels (loading) with SAN. High molecular weight (HMW) capped PPE polymers, low molecular weight (LMW) capped PPE polymers, and copolymers of PPE polymers were tested. The data show that blends of PPE copolymer with SAN result in a single Tg; which indicates the presence of a single phase. Blends with capped and uncapped LMW PPE polymer and HMW PPE polymer result in two phases as illustrated by two Tg values observed. The PPE-SAN copolymer was ca. 20% by weight PPE made from a PPE resin with a 0.31 I.V. as measured in chloroform at 25° C.

TABLE 1

| Polymer | 1 | 2 | 3 | 4 | 5 | 6 | 7 | 8 |
|---|---|---|---|---|---|---|---|---|
| 581 SAN | 100 | 80 | 60 | 60 | 80 | 60 | 60 | — |
| LMW PPE (uncapped) | — | 20 | 40 | — | — | — | — | — |
| LMW PPE (capped) | — | — | — | 40 | — | — | — | — |
| HMW PPE | — | — | — | — | 20 | 40 | — | — |
| SAN-PPE copolymer | — | — | — | — | — | — | 40 | 100 |
| DSC (Tg Onset) | | | | | | | | |
| (SAN) second phase (° C.) | 103 | 105 | 104 | 106 | 104 | 104 | 104 | 114 |
| (PPE) first phase (° C.) | ND | 173 | 165 | 173 | 201 | 204 | ND | ND |
| TGA | | | | | | | | |
| 2nd inflection | 427 | | 458 | 462 | | 468 | 453 | |
| Residue a 2nd inflection (%) | 5.4 | | 34.6 | 29.5 | | 27.1 | 12.5 | |

Table 2 illustrates the results using different loadings of PPE resin with SAN in forming a copolymer, as well as higher (0.31 dl/g) and lower (0.12 dl/g) molecular weight PPE resin. The results illustrate that at wide variety of PPE-SAN copolymer can be synthesized ranging from cross-linked copolymers that are not appreciably soluble in chloroform, e.g., samples 1 and 2, to soluble copolymers, e.g., samples 3 and 5. A product formulation having a less than about 40 wt. % loading of PPE, preferably about 20 wt. % loading of PPE resin is more amenable to melting and processing than the products made with the higher PPE loadings.

TABLE 2

| Samples | Capped PPE IV | PPE Loading | Total solid (g) 20% solid on water | Mn | Mw | Dissolve for GPC | Tg C (on set) |
|---|---|---|---|---|---|---|---|
| 1 | 0.12 | 40 | 100 | — | — | No | 133 |
| 2 | 0.12 | 40 | 100 | — | — | No | 141 |
| 3 | 0.31 | 20 | 100 | 20734 | 59404 | Yes | 111 |
| 4 | 0.12 | 20 | 100 | — | — | No | 109 |

TABLE 2-continued

| Samples | Capped PPE IV | PPE Loading | Total solid (g) 20% solid on water | Mn | Mw | Dissolve for GPC | Tg C (on set) |
|---|---|---|---|---|---|---|---|
| 5 | 0.12 | 20 | 100 | 13179 | 159692 | Yes | 114 |
| 6 | 0.12 | 20 | 150 | 17441 | 123792 | Partial | 114 |
| 7 | 0.12 | 20 | 150 | 18419 | 200229 | Partial | 114 |
| 8 | 0.12 | 15 | 800 | 16791 | 78992 | Yes | 112 |

In order that those skilled in the art may better practice the invention, the preceding examples are given by way of illustration and not by way of limitation and can be repeated with similar success by substituting the generically or specifically described reactants and/or operating conditions of this invention for those used in these examples. The entire disclosure of all applications, patents and publications cited herein are hereby incorporated by reference.

Although the invention has been described above in relation to preferred embodiments thereof, it will be readily understood by those skilled in the art that variations and modifications can be affected in those embodiments without departing from the scope and spirit of the invention.

What is claimed is:

1. A copolymer comprising:
   a) polyphenylene ether segments, and
   b) segments of one or more styrene units, acrylonitrile units and combinations of styrene and acrylonitrile units,
      wherein the polyphenylene ether segments are derived from a polyphenylene ether resin having at least one pair of unsaturated aliphatic carbon atoms, and
      wherein said copolymer is miscible with a styrenic resin.

2. The copolymer as in claim 1 derived from the reaction of:
   a) a polyphenylene ether polymer having at least one end cap, said end cap having at least one pair of unsaturated carbon atoms, and
   b) at least one of b-1 to b-5:
      b-1) styrene and acrylonitrile monomers,
      b-2) styrene/acrylonitrile copolymers,
      b-3) combinations of styrene/acrylonitrile copolymers with styrene monomers acrylonitrile monomers,
      b-4) combinations of styrene/acrylonitrile copolymers and styrene monomers or
      b-5) combinations of styrene/acrylonitrile copolymers with acrylonitrile monomers
         wherein the amount of polyphenylene ether polymer having at least one end cap present during reaction is in the range of 5–20 wt %, based on the total weight of components a+b.

3. The copolymer as in claim 1, wherein the end caps are derived from at least one capping agent.

4. The copolymer as in claim 3, wherein at least one capping agent comprises a vinyl group.

5. The copolymer as in claim 1, wherein the copolymer has a comb-type structure.

6. The copolymer as in claim 3, wherein the capping agent is selected from the group consisting of a methacrylic acid anhydride and acrylic acid anhydride.

7. The copolymer as in claim 1 wherein the polyphenylene ether resincomprises a polyphenylene ether resin having at least one end cap.

8. The copolymer as in claim 1 wherein the polyphenylene ether resin has an intrinsic viscosity of less than 0.32 dl/g as measured in chloroform at 25° C.

9. The copolymer as in claim 7 wherein the end cap is derived from the reaction of a capping agent selected from the group consisting of: methyl methacrylate, ethyl methacrylate, and methacrylic acid anhydride with terminal hydroxy groups on the polyphenylene ether resin.

10. The copolymer as in claim 1 combined with fiber reinforcement and a free radical initiator and having unreacted vinyl groups on the cross-linked copolymer, wherein the cross-linked copolymer is capable of cross-linking by free radical polymerization with an initiator activated by the application of heat, U.V. radiation or electron beam radiation.

11. The/ copolymer as in claim 1, wherein the polyphenylene ether segments are branched from segments comprising one or more styrene units, acrylonitrile units and a combination styrene and acrylonitrile units.

12. A copolymer as in claim 3 wherein the capping agent has one or more vinyl groups and is selected from a group consisting of:
   styrene based monomers,
   acrylic based monomers,
   acrylonitrile based monomers, and
   epoxy based monomers.

13. A composition comprising:
   a) copolymer comprising:
      a) polyphenylene ether segments, and
      b) segments comprising one or more styrene units, acrylonitrile units and combinations of styrene and acrylonitrile units,
         wherein the polyphenylene ether segments are derived from a polyphenylene ether resin comprising at least one end cap, said end cap having a pair of unsaturated aliphatic carbon atoms,
         and wherein said copolymer is miscible with a styrenic resin, and
   b) a styrenic resin selected from the group consisting of polystyreneresins, polystyrene copolymer resins and combinations thereof.

14. The composition as in claim 13, wherein the styrenic resin is selected from the group consisting of polystyrene, expandable polystyrene, acrylonitrile-butadiene-styrene, styrene acrylonitrile, styrene butadiene rubbers, styrene-maleic anhydride, alkyl methacrylate styrene acrylonitrile; polychlorostyrene, polyvinyltoluene, rubber-modified polystyrene, and styrene-methylacrylate.

15. The composition an in claim 13, wherein the polyphenylene ether resin of the copolymers has an intrinsic viscosity of less than 0.32 dl/g as measured in chloroform at 25° C.

16. The composition as in claim 13 wherein the polyphenylene ether resin from which the copolymer is derived, has an intrinsic viscosity of less than 0.20 dl/g as measured in chloroform at 25° C.

17. The composition as in claim 13, wherein the copolymer has a comb-type structure and having polyphenylene ether segments branched from one or more segments comprising styrene units, acrylonitrile units and a combination of styrene and acrylonitrile units.

18. A composition as in claim 13, wherein the polyphenylene ether resin from which the copolymer is derived, has an intrinsic viscosity of about 0.12 dl/g±0.02 as measured in chloroform at 25° C.

19. The composition as in claim 13, wherein the polyphenylene ether segments comprise 5–80 wt % of the copolymer by weight.

20. The composition as in claim 13, wherein the polyphenylene ether segments comprise 50 to 80 wt % of the copolymer by weight.

21. The composition as in claim 13, wherein the styrenic resin which is miscible with the copolymer comprises from 5 to 95 wt % of the total composition.

22. The composition as in claim 13, wherein the styrenic resin which is miscible with the copolymer comprises 25 to 75 wt % of the total composition.

23. The composition as in claim 13, further comprising an additional resin component.

24. The composition according to claim 13, further comprising at least one free radical initiator which is capable of generating a free radical by heat, U.V. radiation, or electron beam radiation.

25. The composition as in claim 13, wherein the composition has a single phase.

26. The composition as in claim 25, having a single glass transition temperature.

27. The composition as in claim 26, wherein the glass transition temperature is within the range of 100° C. to 175° C.

28. The composition as in claim 13, wherein the composition has a heat distortion temperature greater than 125° C. when measured with 264 psi of pressure.

29. The composition as in claim 13, wherein the composition is sufficiently flame retardant so as to char in the presence of air at temperatures above the glass transition temperature of the composition.

30. The composition as in claim 13, which has a V-0 flammability rating and is free of halogen.

31. A composition comprising:
   A) a copolymer comprising:
      i) polyphenylene ether segments, and
      ii) segments comprising one or more styrene units, acrylonitrile units and combinations of styrene and acrylonitrile units,
         wherein the polyphenylene ether segments are derived from a polyphenylene ether resin wherein the polyphenylene ether resin comprises polyphenylene ether polymer chains having at least one end cap having a pair of unsaturated aliphatic carbon atoms,
         and wherein said copolymer is miscible with a styrenic resin, and
   B) a styrenic resin selected from the group consisting of polystyrene, styrene copolymers and combinations thereof; and
   C) at least one polyphenylene ether homopolymer.

32. The composition as in claim 31, wherein the styrenic resin is selected from the group consisting of polystyrene, expandable polystyrene, acrylonitrile-butadiene-styrene, styrene acrylonitrile, styrene butadiene rubbers, styrene-maleic anhydride, alkyl methacrylate styrene acrylonitrile; polychlorostyrene, polyvinyltoluene, rubber-modified polystyrene, and styrene-methylacrylate.

33. The composition an in claim 31, wherein the polyphenylene ether resin has an intrinsic viscosity of less than 0.32 dl/g as measured in chloroform at 25° C.

34. The composition as in claim 31, wherein the polyphenylene ether resin has an intrinsic viscosity of less than 0.20 dl/g as measured in chloroform at 25° C.

35. The composition as in claim 31, wherein the polyphenylene ether segments comprise 50 to 80 wt % of the copolymer by weight.

36. The composition as in claim 31, wherein the styrenic resin which is miscible with the copolymer comprises 25 to 75 wt % of the total composition.

37. The composition as in claim 31, further comprising an additional resin component.

38. The composition as in claim 31, wherein the composition has a single glass transition temperature within the range of 100° C. to 175° C.

39. The composition as in claim 31, wherein the composition is sufficiently flame retardant so as to char in the presence of air at temperatures above the glass transition temperature of the composition.

40. The composition as in claim 31, wherein the composition has a V-0 flammability rating and is free of halogen.

41. The copolymer as in claim 2, wherein the reaction of polyphenylene ether polymer is performed in bulk.

42. The copolymer as in claim 2, wherein the reaction of polyphenylene ether polymer is performed in solution.

43. A method for making a copolymer composition comprising:
   loading a polyphenylene ether resin into a reaction medium comprising styrenic monomers and acrylonitrile monomers,
   wherein the amount of polyphenylene ether resin loaded is 5 to 20 wt % of the total of PPE resin, plus styrenic monomers, plus acrylonitrile monomers,
   and wherein the polyphenylene ether resin comprises at least one polyphenylene ether polymer having at least one end cap, said end cap having a pair of unsaturated aliphatic carbon atoms, and
   polymerizing the polyphenylene ether resin, styrenic monomers and acrylonitrile monomers within said reaction medium.

44. The method as in claim 43, wherein the the polyphenylene ether resin from which the copolymer is derived, has an intrinsic viscosity of about 0.12 dl/g±0.02 as measured in chloroform at 25° C.

45. The method as in claim 43, wherein the amount of polyphenylene ether resin loaded is 5 to 15 wt % of the total of the polyphenylene ether resin, styrenic monomers and acrylonitrile monomers.

46. The method as in claim 43, wherein the amount of polyphenylene ether resin loaded is 10% to 15% by weight of the total of the polyphenylene ether resin, styrenic monomers and acrylonitrile monomers.

47. The method as in claim 43, further comprising blending the cross-linked copolymer with a styrenic resin, and forming beads from the blend for further melt processing.

48. The method as in claim 43 wherein the reaction medium is a bulk reaction medium and the polymerization is performed in bulk.

49. The method as in claim 43 wherein the reaction medium additionally contains a liquid suspending the polyphenylene ether resin, styrenic monomers, acrylonitrile monomers or a combination thereof and the polymerization is performed in suspension.

* * * * *

UNITED STATES PATENT AND TRADEMARK OFFICE
CERTIFICATE OF CORRECTION

PATENT NO. : 6,620,885 B2
DATED : September 16, 2003
INVENTOR(S) : Guo et al.

It is certified that error appears in the above-identified patent and that said Letters Patent is hereby corrected as shown below:

Title page,
Item [73], Assignee, after "Company" delete "Pittsfield, MA" and insert
-- Schenectady, NY --.

Column 3,
Line 43, after "on" delete "balancc" and insert -- balance --.
Line 43, after "and" delete "tarc" and insert -- tare --.

Column 4,
Line 16, after "of" delete "a".

Column 6,
Line 58, after "end caps" delete "no" and insert -- not --.

Column 7,
Line 24, delete the first instance of "a".
Line 34, in the formula heading, delete "oxide" and insert -- ether --.

Column 9,
Line 50, after "polystyrene" delete "(IIIRS)" and insert -- (HIPS) --.

Column 10,
Line 25, after "for" delete "polyphylene" and insert -- polyphenylene --.
Line 37, after "and" delete "isotatic" and insert -- isotactic --.
Line 48, after "comprise" delete "of" and insert -- from --.

Column 11,
Line 3, before "by" delete "generated" and insert -- genated --.
Line 50, before "suitable" delete "non-fiberous" and insert -- non-fibrous --.

Column 15,
Line 66, after "ether" delete "resincomprises" and insert -- resin comprises --.

UNITED STATES PATENT AND TRADEMARK OFFICE
CERTIFICATE OF CORRECTION

PATENT NO. : 6,620,885 B2
DATED : September 16, 2003
INVENTOR(S) : Guo et al.

It is certified that error appears in the above-identified patent and that said Letters Patent is hereby corrected as shown below:

Column 16,
Line 15, before "co polymer" delete "The/" and insert -- The --.
Line 18, after "combination" insert -- of --.
Line 39, before "polystrene" delete "polystyeneresins" and insert
-- polystyrene resins --.

Signed and Sealed this

Twenty-first Day of February, 2006

JON W. DUDAS
*Director of the United States Patent and Trademark Office*